May 22, 1951

H. D. CANAZZI ET AL 2,553,548

ROTARY INTERNAL-COMBUSTION ENGINE OF THE HELICAL PISTON TYPE

Filed Aug. 14, 1945

Inventors
HENRY D. CANAZZI
WALTER S. PAWL

By Ralph L. Chappell
Attorney

May 22, 1951     H. D. CANAZZI ET AL     2,553,548
ROTARY INTERNAL-COMBUSTION ENGINE OF THE
HELICAL PISTON TYPE

Filed Aug. 14, 1945     7 Sheets-Sheet 2

Inventors
HENRY D. CANAZZI
WALTER S. PAWL

By Ralph L Chappell
Attorney

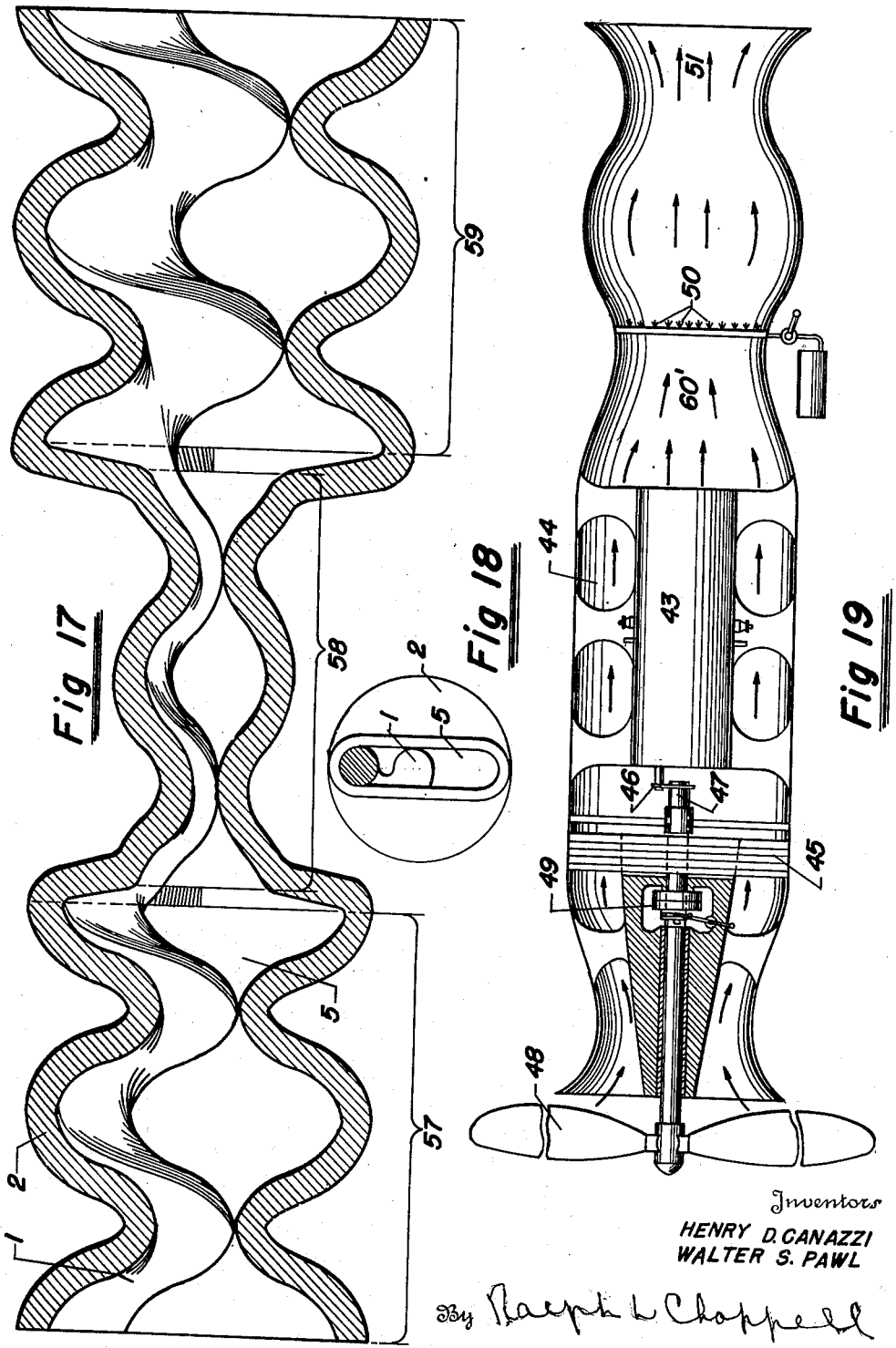

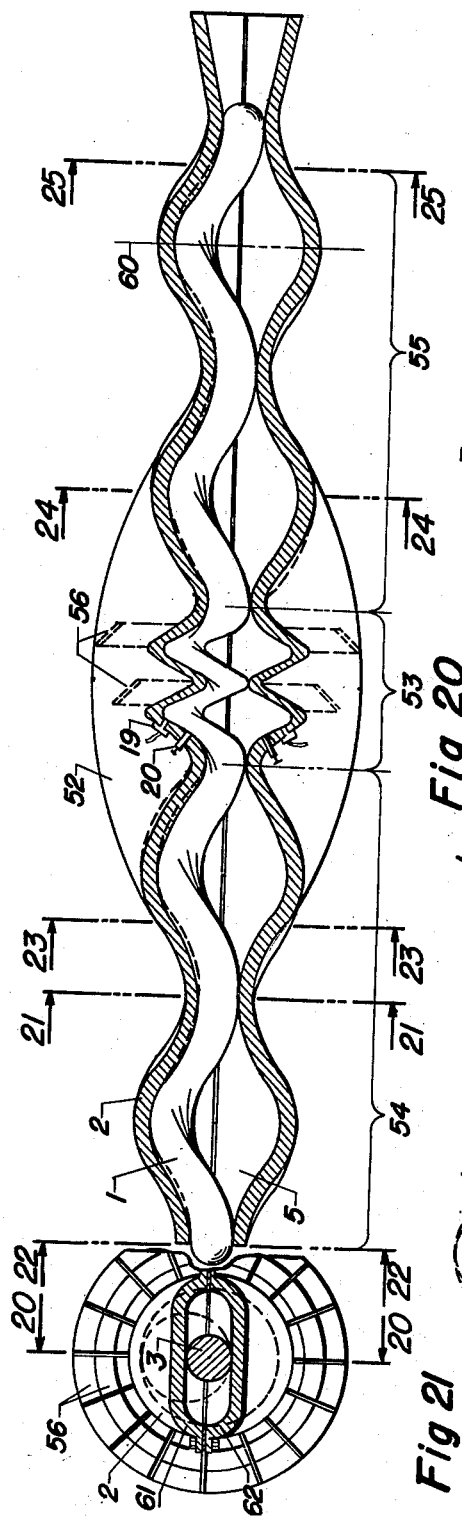
May 22, 1951
H. D. CANAZZI ET AL
2,553,548
ROTARY INTERNAL-COMBUSTION ENGINE OF THE
HELICAL PISTON TYPE
Filed Aug. 14, 1945
7 Sheets—Sheet 4
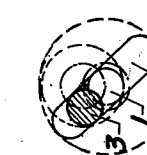 Fig 25   Fig 29
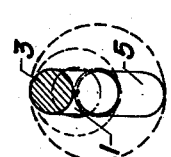 Fig 24  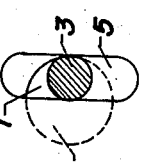 Fig 28
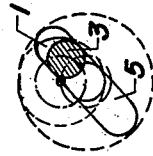 Fig 23   Fig 27

Fig 20
Fig 21
Inventors
HENRY D. CANAZZI
WALTER S. PAWL
By Ralph W. Chappell
Attorney Inventors
HENRY D. CANAZZI
WALTER S. PAWL By Ralph L Chappell Attorney May 22, 1951　　H. D. CANAZZI ET AL　　2,553,548
ROTARY INTERNAL-COMBUSTION ENGINE OF THE
HELICAL PISTON TYPE
Filed Aug. 14, 1945　　　　　　　　　　　　　　　7 Sheets-Sheet 6

Inventors
HENRY D. CANAZZI
WALTER S. PAWL

By Ralph L. Chappell
Attorney

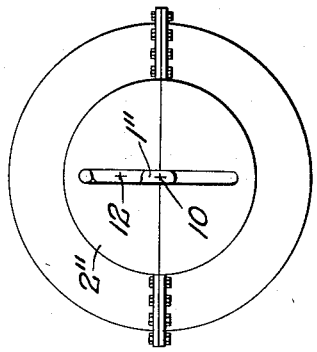
Fig. 46.
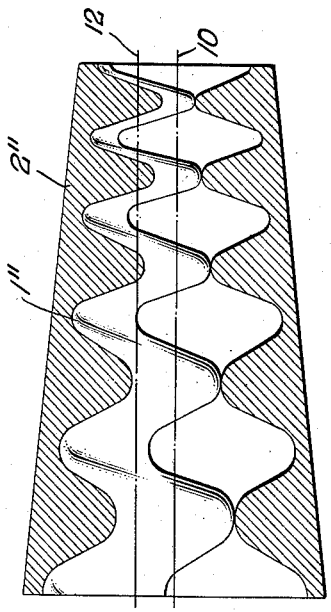
Fig. 45.
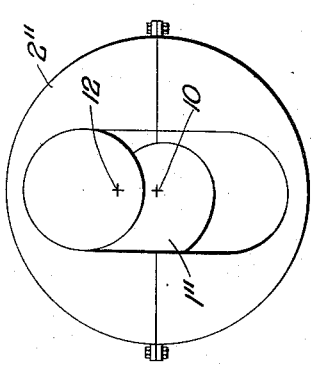
Fig. 44.
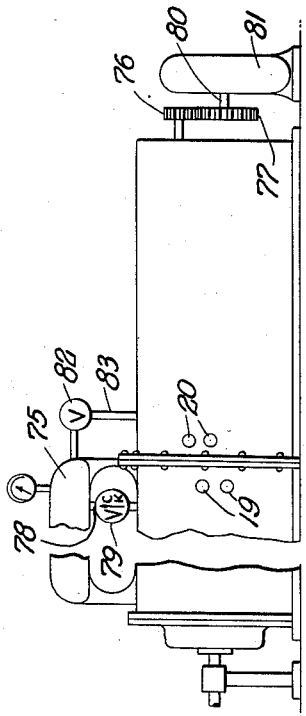
Fig. 43.
Inventors
HENRY D. CANAZZI
AND WALTER S. PAWL
by
Attorney Patented May 22, 1951

2,553,548

UNITED STATES PATENT OFFICE 2,553,548

ROTARY INTERNAL-COMBUSTION ENGINE OF THE HELICAL PISTON TYPE

Henry D. Canazzi, Buffalo, N. Y., and Walter S. Pawl, Prince Georges County, Md.

Application August 14, 1945, Serial No. 610,860

11 Claims. (Cl. 123—8)

(Granted under the act of March 3, 1883, as amended April 30, 1928; 370 O. G. 757)

This invention relates to rotary compressor or engine power units. More particularly, these power units consist of a worm or helical shaped piston member, having a constant helical diameter, operating in a planetary motion within a helically formed space in a stator element, whereby to cause the gradual formation of chambers at one end of the stator space, close them and progressively move them to the other end whereby they are opened and then gradually eliminated until they disappear. The basic dimensional relations on which the proper operation of the present devices depends are:

The unitary worm shaped piston has a circular cross-section of radius $r$, a helical pitch diameter $d$, and a helical pitch $p$, and rotates in a planetary motion in a helically twisted space which has a cross-section with a width equal to $2r$, and semi-circular ends of radius $r$ spaced at a distance of $2d$, no helical pitch diameter, and a helical pitch of $2p$. The values of $r$ and $p$ or either one of them may be varied along the axis of the device, provided that the above relations are maintained for each particular axial portion or increment of the device along the axis. The pitch diameter $d$, however, has to be maintained constant throughout the axis of any one device, since this value determines the planetary relation between the parts, which obviously has to be the same all along the axis if the parts are to be made rigid.

By using a construction having a changing helical pitch $p$ holding $r$ and $d$ constant, the volume of the moving chambers is varied proportionately as they are moved axially by the relative planetary rotation of the parts, for the purpose of compression or expansion of the contents, depending on whether the pitch $p$ is decreased or increased respectively. Thus a gaseous fluid may be compressed or expanded by the operation of such device; or the expansion of a compressed gas or the suction of rarified gas might be used as a propelling means for operating the device as a pneumatic motor.

In an alternative, more simple form of compressor, or rather positive displacement pump or motor the end of the helical space of one or more complete helical twists in length having a uniform helical pitch, may be directly connected to a storage chamber wherein the gases are compressed or rarified to any degree desired by accumulation or suction, a constant positive supply of volumes being delivered to or withdrawn from the chamber by the rotation of the helical piston in the case of the use of the device as an accumulator or suction pump, or wherein the difference of pressures in the chamber and at the open end of the helical space operates to turn the worm piston in case the device is used as a motor.

Assuming the speed of rotation to be constant, if the twist is of a constant helical pitch $p$ and the piston section of a constant diameter $2r$, the pressure of the gas at the delivery will be the same as that at the intake. By changing the helical pitch or the diameter of the piston, or both, in the course of the twist, any desirable pressure of the gas at the delivery end may be obtained at a correspondingly inverse volumetric rate of flow, so that the total mass rate of flow is maintained constant, depending only on the rate of rotation.

As an alternative form of this present invention, an internal combustion engine may be constructed as a simple combination of a helical worm piston operating in a helically formed engine space, having three portions with three different sets of helical pitches for the elements: The first portion at one end where the intake and compression stages occur has one set of helical pitches, $p_1$ for the piston and $2p_1$ for the space, followed by the combustion portion having a suitably reduced set of pitches, $p_2$ and $2p_2$, and an expansion and exhaust portion at the other end, having a set of pitches $p_3$ and $2p_3$, respectively, preferably similar to or slightly greater than those of the intake and compression section. Thus, in this form of device, all the stages in the internal combustion process are carried out progressively from one end of the device to the other in overlapping relation, so as to provide a constant flow of gases through the inlet end as well as through the outlet or exhaust end. The chambers are formed at the inlet end, being filled with atmospheric air, for the fuel injection type of engine, and moved into the combustion portion while being suitably compressed. Then the injection of fuel followed by ignition in the combustion portion results in expansion of the gases in the expansion and exhaust portion as the chambers are further moved and expanded through that portion. The expansion may be carried out to atmospheric pressure so as to get the full benefit of the energy of the gases prior to exhausting by making the helical pitch in this portion suitably greater than that of the inlet portion.

The compression and expansion in other forms of internal combustion engines may be obtained by varying the radius of the cross-section of the piston so as to suitably vary the volumes of the closed chambers as they move from the intake end to the exhaust end of the engine. Or the volumes might be varied by any combination of variations in the pitches as well as the radius of the piston section.

The compression in another form of internal combustion engine may be obtained by providing a transverse dividing wall formed at a suitable point, as a part of the rotor, against which the chambers are reduced to obtain any degree of compression desired, prior to being opened through an outlet valve to a chamber being formed on the other side of the transverse wall where the ignition may be initiated and this chamber then expanded to its full normal size by the expansion of the gases which thus turn the rotor. This expansion may be carried out even further to atmospheric pressure by a suitably increased helical pitch of the piston or its cross-sectional radius for better economy.

The object of this invention is to provide a simple form of rotary compressor or engine power unit.

Another object is to construct a compressor or engine power unit having essentially but two main operating elements, the rotor and the stator, shaped so as to provide their own bearing surfaces, and to restrict the rotor to a planetary motion relative to the stator.

Another object is to construct a fluid compressor pump, motor or engine power unit comprising a helical worm piston having a variable helical pitch, operating in a helically twisted space having a pitch twice as long as that of the corresponding portion of the piston.

Another object is to construct a compressor engine unit having a helical worm piston with a circular section of variable diameter, operating in a planetary motion within a helically twisted space having a pitch twice that of the worm and a cross-section of a width equal to the diameter of the corresponding section of the worm piston and having semi-circular ends, the centers of the semi-circles being spaced a distance equal to twice the helical pitch diameter of the worm piston.

Another object is to construct an internal combustion engine having a helical worm piston of circular cross-section operating in a planetary motion within a correspondingly helically twisted space for the formation and movement of closed chambers from one end of the space to the other, the worm piston having a variable helical pitch comprising three portions, the mid-portion having a pitch of sufficiently reduced value to provide the necessary compression of the gases and the exhaust end portion having a slightly greater helical pitch than the inlet end portion for the purpose of using the full expansion of the combustion gases down to atmospheric pressure prior to their exhaust.

Another object is to construct an internal combustion engine having a helical worm piston of circular cross-section operating in a planetary motion within a correspondingly helically twisted space, for the formation and movement of closed chambers from one end of the space to the other, the piston worm having a dividing wall and a port connecting the opposite sides of said wall in such manner as to form a valve between a chamber or volume of gases moving against one side of the wall and a chamber being formed at the other side of said wall during operation, for the purpose of transferring the compressed gases from said one side of the wall to said other side, and means for igniting them on said other side of the wall to initiate combustion before the chamber is expanded.

Further and more specific objects will become apparent as this invention is further disclosed in detail having reference to the accompanying drawings wherein:

Figs. 17 and 18 are a sectional and an end view respectively of another form of internal combustion engines based on the form of compressor illustrated in Figs. 4 to 6;

Fig. 19 illustrates diagrammatically an illustrative arrangement in a jet propelled aircraft, in which one form of the engine of the present invention might be used;

Fig. 20 is a sectional view of an internal combustion engine of this type showing the arrangement of cooling fins and baffles which might be used for controlling the maximum temperatures of the parts during operation, assuming that the air flow is in an axial direction;

Fig. 21 is a sectional view taken at the the correspondingly numbered section line of Fig. 20;

Figs. 22 to 25 are sectional views taken at the section lines 22, 23, 24, 25, of Fig. 20, and illustrate diagrammatically the relative positions of the worm piston in the operating helical space;

Figs. 26 to 29 illustrate the relative positions between the parts at a phase of operation a quarter of a turn later to those occupied by the parts as shown in the Figs. 22 to 25, respectively;

Fig. 43 is an engine unit of the type illustrated in Fig. 34, with a compressed-air starter, connected thereto and automatically replenished from the engine compression charges; and Figs. 44 to 46 are sectional and end views of a compressor unit based on the combined effect of a variable helical pitch and a variable worm section diameter.

Figure 1:
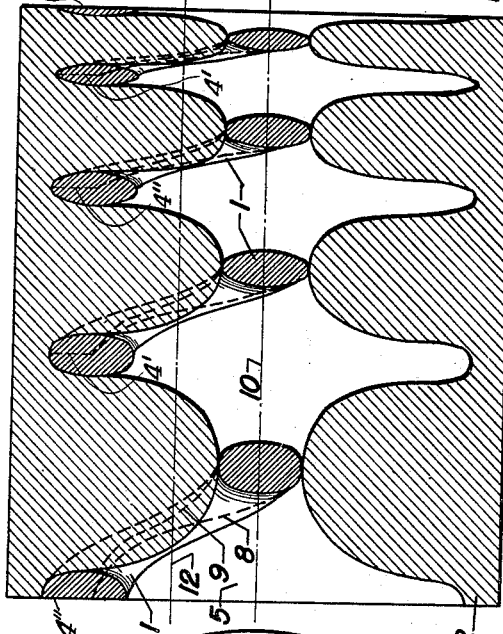
Fig. 1 shows an axial section of the simplest form of a compressor unit in accordance with the present invention.

Referring to the several figures of the drawing, wherein similar parts are indicated by the same numerals, the compressor in Fig. 1 comprises a worm piston 1 operating in a helically twisted space 5 in the stator element 2. The worm piston has a circular normal cross-section 3 of a radius $r$ and a constant helical pitch diameter $d$, and its helical pitch varies along the axis of this pump unit, decreasing to a minimum at its right end which is the delivery end. The normal cross-section of the twisted space 5 has a width equal to $2r$ and has semi-circular ends 4 corresponding in size to the circular section 3 of the worm, the centers 6 and 7 of the semi-circular ends being always spaced a distance of $2d$. In the illustrated design, the pitch diameter $d$ is equal to $4r$, although this pitch diameter may be of any other suitable size as may be desirable. The instantaneous helical pitch of the helically twisted space 5, however, is always double that of the corresponding increment of the worm piston 1 which operates therein, viz.:

$$\frac{\Delta l_s}{\Delta n_s} = 2 \frac{\Delta l_p}{\Delta n_p}$$

wherein: $l_s$ is any axial length of the helical space, $n_s$ is the corresponding number of turns of the space, $l_p$ is the corresponding axial length of the helix of the worm piston, and $n_p$ is the corresponding number of turns of the worm piston. Consequently, a double helical line bearing at 8 and 9 is formed between the two members, limiting the worm to a planetary movement within this space about the axis 10 of the twisted space in one direction (arrow 11) while, at the same time, it rotates about its own axis 12 in the opposite direction (arrow 13), so that its cross-section 3, at any point along its axis, reciprocates in a plane normal to the axis between one end of the corresponding cross-section 5 of the twisted space and the other, thus forming axially successive and overlapping chambers on its opposite sides and closing each one off as they are formed and move helically about and along the axis of the twisted space. With a constant speed of rotation, the speed of this reciprocation would follow a sine value relation to the rotation of the worm. At the end of each reciprocating stroke, cross-section 3 would also instantaneously form a line contact with the corresponding semi-circular end 4 of the cross-section of the twisted space 5. This line contact represents the seal between the axially adjacent chambers in the device, whereas the double helical line bearings 8 and 9 represent the seals between the laterally overlapping adjacent chambers on opposite sides of the worm piston. Thus the semi-circular line contacts 4' at alternate turns of the worm piston constitute the ends of each chamber formed along one complete turn of the twisted space 5 on one side of the piston 1, this chamber being bounded laterally by the helical line contacts 8 and 9 along the piston and chamber space between these semi-circular end contacts. On the other side of the piston adjacent this chamber are two overlapping portions of similarly formed chambers separated axially by a semicircular line contact 4'' at the intermediate turn of the helical or worm piston.

As the piston describes its planetary motion within the twisted space, the semi-circular line contacts move helically about the periphery of the twisted space, always being spaced one complete turn of the piston, the alternate semi-circular contacts defining the ends of their corresponding chambers which overlap each other in the twisted space on the opposite sides of the piston. This operation may be better understood by reference to the diagrams of Figs. 13 to 16, hereinafter more fully described.

Figure 2:
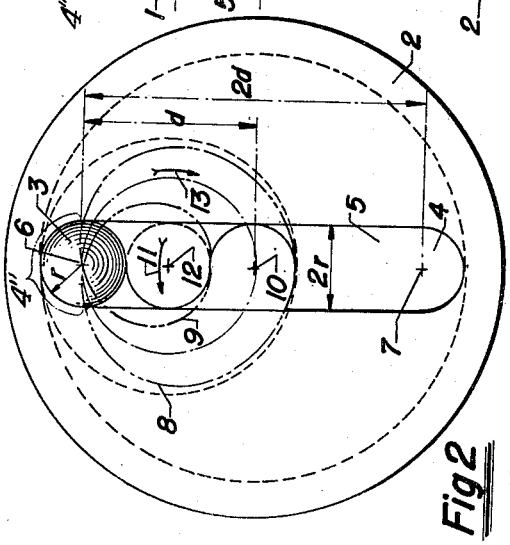

It will be noted in Fig. 1 that, since the helical pitches of the piston and space are gradually reduced from left to right, if the piston is turned as indicated by the arrows in Fig. 2, the chambers formed and closed off at the left end of the device will move toward the right end where they will open and discharge, having been in the interim compressed to a volume reduced in proportion to the reduction in the helical pitches. If the piston were turned in the opposite direction, the reverse formation and movement of the chambers, traveling from right to left in Fig. 1, would expand their volumes before discharge at the left end of the device.

Figure 4:
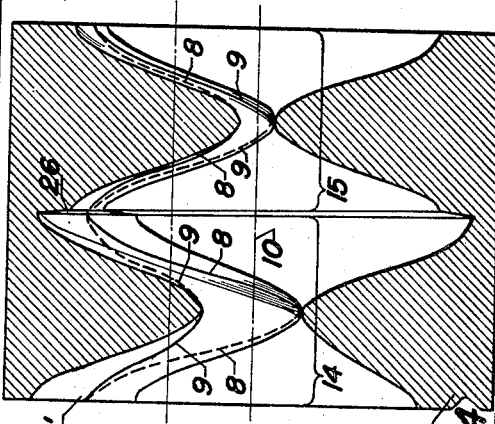

In Fig. 4, the helical pitch $$\frac{l_p}{n_p}$$

of the worm piston 1' as well as its helical pitch diameter $d$ are constant throughout both its portions 14 and 15 although the diameter of the worm section is changed to a smaller value in the outlet portion 15 whereby the volume of the chambers formed between the two members is considerably reduced along this portion, so that as the chambers move from one portion to the other during the rotation of the worm member, they are reduced to produce the necessary compression before being discharged at the right or discharge end of the unit. In practice, at least one complete turn of the helical space would be used in each portion of the device 14 and 15 in order to get a complete chamber formed in each portion before it is moved into the next or discharged after full compression.

In either of the above forms of the device the change from a larger to a smaller helical pitch or section diameter of the worm piston may be either sudden or gradual. The device may also be made with a simultaneous reduction in both the pitch and the section diameter. What determines the degree of the ultimate compression is the relation of the volumes of the chambers at the time when they are first formed and completed in the first complete helical turn of the piston working space, to their volumes just prior to their opening and discharge in the last complete helical turn of this space, regardless of the type of variation in helical pitch or in cross-sectional area or both all along the length of the device.

The worm 1' in Fig. 4 is shown in full so that the nearest half of it extends in front of the plane of the axial section of the casing or stator element 2'. The connection between the two portions 14 and 15 is made by a conical frustrum 26 between the adjacent ends of the worm portions and a correspondingly shaped opening in the casing.

Figure 3:
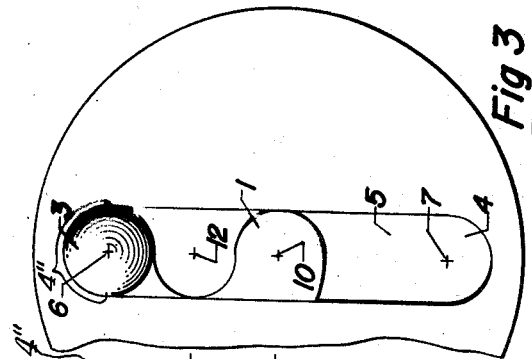
Figs. 2 and 3 are the corresponding end views thereof.
Figure 6:
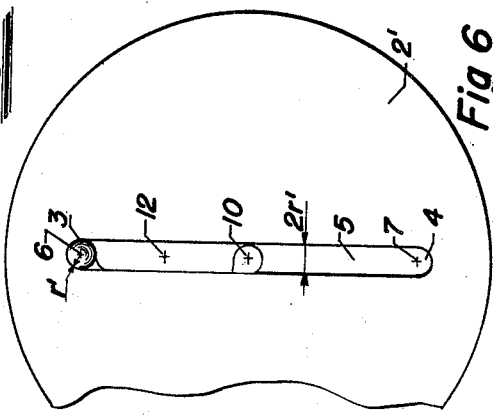
Figs. 4 to 6 are similar views of another form of compressor unit.
Figure 5:
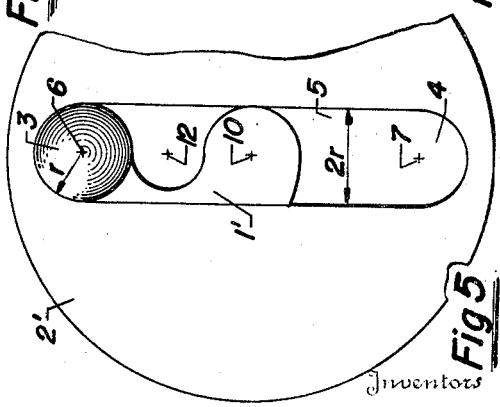

The end views of this device shown in Figs. 5 and 6 show the difference in sizes of the cross-sectional areas of the worm and chamber space at the two ends. If $r$ is equal to $4r'$, the cross-sectional areas 5 of the chambers at the two ends will be related in the same proportion since the large area $= 2d \times 2r = 2d \times 2(4r') = 16dr'$ which is 4 times the small area which equals $2d \times 2r'$ or $4dr'$. The volumes of complete chambers in the two portions having the same axial lengths, since the helical pitch is uniform, will therefore also be in the same relation to each other. With at least one complete turn of the helical space in each portion, the compression obtained would be 4 to 1 or in direct proportion to the radii of the worm in the two portions.

Since the volumes are also directly proportional to the helical pitches it may likewise be shown that the compression in the variable pitch form of the device will depend on the change in pitch. In a device having a reduction in both pitch and cross-section radius as illustrated in Figs. 44 to 46, the compression will therefore depend on the product of the pitch and cross-section ratios.

Another way of obtaining compression without resorting to reduction in helical pitches or diameters is to form a baffle on the piston, such as shown at 67 in Figs. 34 to 42, against which the chambers are compressed prior to opening valve port 68 for transferring the compressed gases to an expanding chamber on the other side of the baffle, as more fully hereinafter described.

Figure 7:
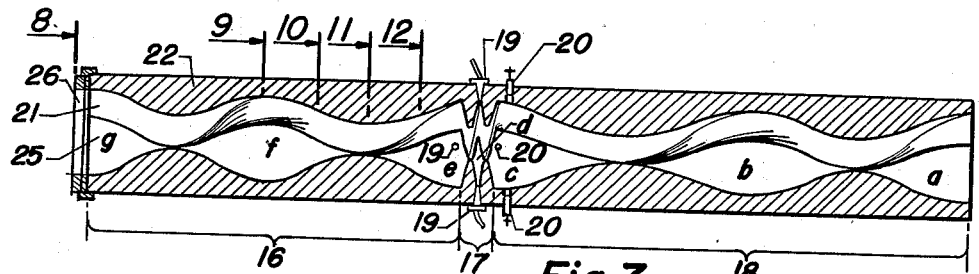
Fig. 7 is a sectional view of a simple form of an internal combustion engine illustrating this invention.
Figure 8:
Fig. 8 is an end view thereof.
Figure 9:
Figs. 9 to 12 are sectional views showing the relations between the worm piston and the stator space at four different points along the axis, as indicated by the correspondingly numbered section lines in Fig. 7.
Figure 10:
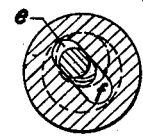
Figure 11:
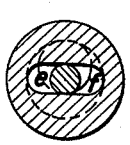
Figure 12:
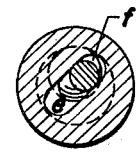
Figure 13:
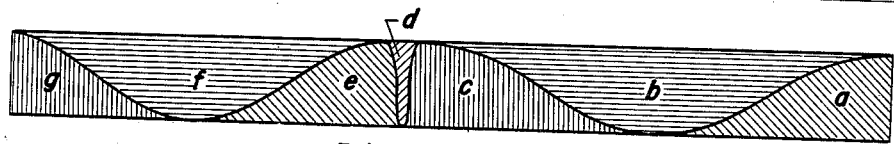
Fig. 13 is a diagrammatic development of the chambers formed by the above internal combustion engine unit, assuming the stator space to be untwisted into one continuous plane.

In Fig. 7, the simple form of internal combustion engine shown based on the present invention, comprises essentially three axial portions: The inlet and compression portion 16, the combustion portion 17 and the expansion and exhaust portion 18. The rotor 21 and the stator space 25 have a constant cross-section and related helical pitches in each of these portions, the pitch of the space being always double that of the rotor worm; however, in the combustion portion 17 these pitches are necessarily considerably reduced in order to provide the necessary compression of the gases by a sufficient reduction in the volumes of the chambers as they move through this portion. The expansion and exhaust portion 18 may have the same helical pitches as the inlet and compression portion 16 thereof, although it may have comparatively greater pitches, if desirable, to provide for an expansion which will produce a final exhaust pressure more comparable to the atmospheric pressure than is possible at present, in the ordinary reciprocating piston type of engines, so as to get the full benefit of the usually unexpanded exhaust. On the other hand, this portion may have smaller helical pitches than the inlet and compression portion or a part of this portion may be cut off at the discharge end, providing for a higher exhaust pressure, where a part of the exhaust energy is desirable for some other purposes.

For purposes of illustration a compression ratio of about 12 to 1 is shown on the inlet side and an expansion ratio of about 16 to 1 on the exhaust side of the engine. Fuel injectors 19 and ignition plugs 20 may be connected at suitable points along the combustion portion. No driving connections are shown in this view but it is understood any drive means may be designed and some of these are illustrated in other views and will be later referred to. An adaptor fitting such as 26 may be used for the drive connection and carburetor if used, or for mounting accessories, etc.

Figure 30:
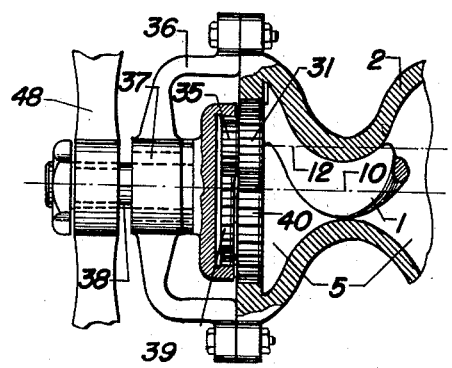
Figs. 30 to 33 illustrate four forms of drive gear connections.
Figure 31:
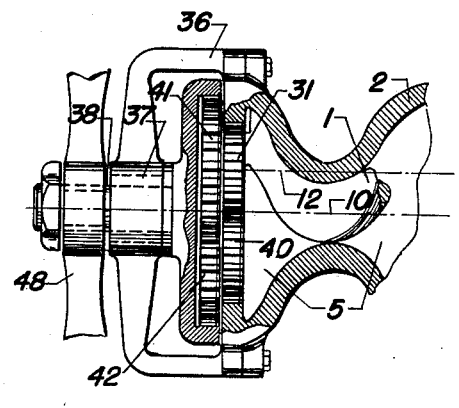
Figure 33:
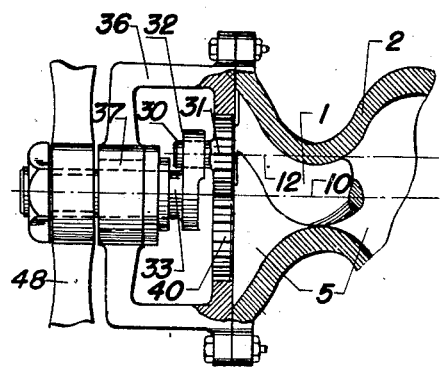

In view of the planetary motion between the parts, it is possible to provide the end of the worm piston with a planetary gear mounted concentrically thereon and operating within an internal ring gear fixed in the stator element centered on the axis of the operating space and having a pitch diameter equal to twice the pitch diameter of the planetary gear as shown e. g. in Figs. 30, 31 and 33. A shaft 30 on this planetary gear 31 may then be pivotally connected to a crank arm 32 rotating on a shaft 33 axially aligned with the axis 10 of the operating space 5. The power may then be taken off at this shaft 33 for delivery to any desired destination.

A simple form of speed reduction mechanism in this drive may be constructed by forming another planetary gear 35 axially on the one attached to the piston element, said other planetary gear 35 having a pitch diameter less than that of the piston element, and providing a spider frame 36 extending from the end of said stator element 2 and supporting an axial bearing 37, a drive shaft 38 being mounted in this bearing and having an internal ring gear 39 mounted thereon with a pitch diameter sufficiently less than that of said first-named ring gear 40 to mesh with the said other planetary gear 35.

Figure 32:
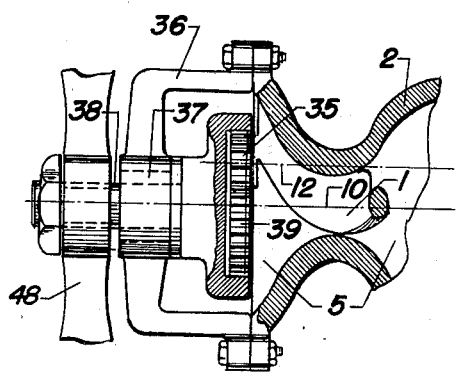

In this reduction mechanism the provision of the ring gear 40 in the stator element and its planetary gear 31 is optional and these gears may be omitted as shown in Fig. 32, the said other planetary gear 35 being in this case formed directly on the end of the worm piston element 1. The primary planetary motion is then obtained directly from the operation of the piston 1 in the helically twisted operating space 5. The use of the gears 31 and 40 is merely to supplement the drive reaction forces between the piston and stator elements which naturally cause or restrict the relative motion between the elements to such planetary path. These gears may thus be used when desirable to relieve a part of the bearing stresses between the elements, but are not essential to the operation of the drive mechanism.

In this mechanism, by making the said other planetary gear 35 and its ring gear 39 correspondingly larger than the planetary and ring gears 31 and 40 attached to the piston and stator elements, a reversal in the rotation of the drive shaft may readily be obtained and its relative speed may then be determined by the relative sizes of these larger gears, such as 41 and 42 respectively of Fig. 31. Other drive gear combinations may obviously be used for either reducing or increasing the speed of drive to suit requirements as well as determining its direction of rotation.

Figure 14:
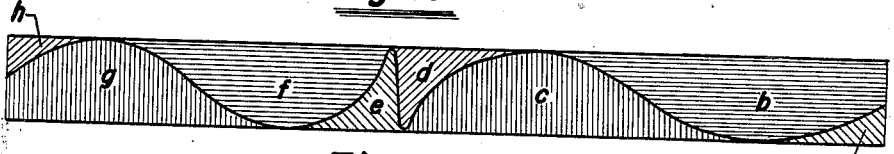
Figs. 14 to 16 are similar diagrammatic views illustrating the successive stages in the operation of the above unit, having a difference of one quarter turn between them.
Figure 15:
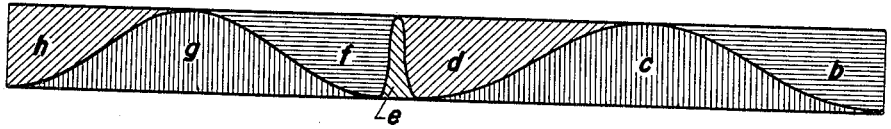
Figure 16:
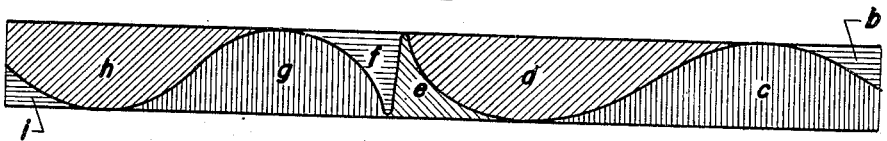

In Figs. 13 to 16 are shown diagrams illustrating the successive stages differing in phase by one quarter turn of the rotor about the stator axis in an engine unit of the type shown in Fig. 7. They represent untwisted flat layouts of the chambers with the assumption that the helical space in the unit is untwisted into a flat form carrying the worm member with it into the same plane, and that the worm member is reduced in section to a partition of line thickness between the chambers. The rotation of the worm member in the engine produces a change in these diagrams equivalent to the axial translational movement of the curved lines representing the worm member, as shown, within the parallel boundaries of the chamber space, in the consecutive figures, while the pitch of these lines changes as the chambers move from one portion of the engine to the other in accordance with the difference in the helical pitches used in each of the three portions of this unit. It may be seen from a study of these diagrams that each successive chamber $a$, $b$, $c$, $d$, $e$, $f$, $g$, $h$ and $i$ is gradually formed at one end of this unit as it moves along the axis thereof, is completely formed and closed before it begins to reduce in size, is then reduced to its minimum when it occupies the combustion portion, and is then reexpanded to its full normal size in the exhaust portion before it is opened at the end, and then gradually reduced to nothing, to provide the equivalent of the exhaust stroke in a reciprocating piston type engine. The phases represented by the consecutive diagrams are spaced one quarter turn apart beginning with the phase shown in Fig. 7 being represented in Fig. 13. Fig. 14 shows the progress of these chambers wherein chamber a is completing its exhaust, b is beginning its exhaust, c is completing its expansion, d is beginning its expansion, e is completing its compression, f is beginning its compression, g is completing its intake, and h is beginning its intake. In Fig. 15, a quarter of a turn later, a has completed its exhaust and disappeared, b is half exhausted, c has just completed its expansion, d is about half expanded, e is fully compressed, combustion being initiated therein, f is about half compressed, g is fully formed and completed its intake, and h is half formed. These stages correspond to those held originally by chambers a to g respectively in Fig. 13. In Fig. 16, the chambers b to i have advanced to the stages reached by a to h respectively in Fig. 14. After the next quarter turn the diagram shown in Fig. 13 would repeat itself with the chamber c occupying the position of chamber a in Fig. 13, etc. Thus a new combustion cycle is obtained every half turn of the engine.

It will be noted that the advantage of this type of engine in the formation of these chambers is that there is no problem of scavenging involved, in that each successive chamber is entirely newly formed and is completely exhausted individually. There are no separate valves involved, as such, and there are no valve operating troubles, the flow at the intake as well as the exhaust is at a constant rate, depending only on the rate of rotation, and does not involve any pulsations but a continuous uniform mass stream, since the formation of the chambers is so overlapped that the total cross-section at the inlet remains constant throughout the operation, and the gases are moved uniformly as a part of each chamber axially at a rate depending only on the speed of rotation. A constant practically uniform flow of power is thus obtained as the resulting torques obtained from the successive impulses overlap each other so that the average torque is substantially constant at any speed depending only on the amount of fuel fed.

In another form of internal combustion engine which is based on the form of compressor shown in Figs. 4 to 6 and illustrated in Figs. 17 and 18, the pitches of the elements may be maintained constant throughout the three portions of the engine 57, 58 and 59, corresponding to the three portions hereinabove described, but the diameter of the worm may be changed, instead, to a degree necessary, to furnish the reduction in size of the chambers as they pass through the combustion portion. It will be noted in Figs. 5 and 6 that in both the large and the small diameter parts of the worm, the same relation between the radius of the worm section and the corresponding section of the operating space is maintained, thereby allowing the same planetary motion between the moving and stationary parts in both portions, so that all the portions of the worm piston may operate as a unit in their respective operating space sections. The same advantage may therefore be obtained with this form of engine as in the form illustrated in Fig. 7, although, due to the concentration of the heat in the smallest portion in the engine with respect to the diameter thereof, this form might be objectionable for some purposes where proper cooling may be difficult. It may be advantageous however in other cases. Any combination of the two forms shown in Figs. 7 and 17 might also be used wherever deemed desirable.

The arrangement of fuel injectors and ignition means may be as shown in Fig. 7 or may be varied to suit requirements, and any number of injectors as well as ignition means might be suitably distributed in any particular construction.

Fig. 19 shows an illustrative adaptation of the present invention to a jet propulstion combination used for aircraft. The engine 43 is mounted within the compartment 44 in the stream of the compressed air from the compressor 45 in the forward end of the compartment, which compressor might have one or more cooling stages incorporated therein, part of this compressed air being used for supplying the air to the engine. The engine worm is connected through a crank 46 and driving shaft 47 to the compressor for its operation. This shaft may be extended forwardly, and a propeller 48 might be mounted at its forward end through a clutch means 49 so that a propeller drive may be used for starting off the ground and for operating at the lower speeds. At higher speeds the propeller may be disconnected by releasing the clutch means 49, and its blades feathered for maximum pitch to reduce the obstruction to the air flow while propulsion is obtained entirely by jet action. This engine is particularly adaptable to such combinations as shown in Fig. 19 because of its long axis fitting readily in the long tubular gas compartment 44, and because the exhaust being discharged at its rear will readily supplement the flow of the compressed gases from the compressor, and be discharged together as the gas propelling jet 69' from the rear of this tube. Supplemental fuel combustion might be used at the point indicated by the fuel nozzles 50 prior to ejection from the jet 51 to increase the force of propulsion.

Figs. 20 and 21 show a construction that might be used in connection with this combination, and show the arrangement of cooling fins 52 around the combustion section 53 and a part of the compression and exhaust portions 54 and 55, with baffles 56 for directing the air stream inwardly against the hottest parts of the engine casing 2. Also, this construction shows equivalent inlet and exhaust portions. A preferable construction for use in this combination would be to cut off the parts at a quarter or more of the last helical turn of the casing 2, e. g. at 60 so as to exhaust the gases of combustion prior to their full expansion, and use a part of their expansive force in the formation of the jet stream. The stator or casing 2 may be formed in halves 61 and 62, having flanges along the outside, whereby they may be fastened together to assemble the complete unit around the rotor 1. Where the portions of an engine comprise end portions, one of which has a constant helical pitch differing from that of the other, the stator element of each end portion may be made as a unit, and the adjacent portions may be provided with end flanges for joining the portions together by bolts passed through these flanges, since in the case of a constant pitch, the rotor element can be inserted into place in the stator by insertion from one end, whereas if the pitch is variable, such insertion would not be possible, and the stator in such case has to be made at least in two parts so as to make it possible to assemble it around the rotor.

Figures 22, 26:
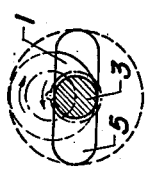

A study of Figs. 22 to 29 will help to visualize the form of the elements by comparison of the sections taken at the various places indicated by the section lines in Fig. 20 corresponding to the figures numbered by the same numerals. These figures are more or less diagrammatic showing merely the sections of the worm and the operating space, the outline of the casing being entirely omitted. It will be understood that the section taken normal to the axis of Fig. 20 repeats itself for every revolution of the worm piston. In other words, the section at line 22 and shown in Fig. 22 is the same at line 21 and at every complete turn of the worm therefrom. The section shown in Fig. 23 represents any normal section along the axis of Fig. 20 spaced one quarter turn of the worm to the right of any section represented by Fig. 22. The section shown in Fig. 24 likewise represents any section taken at a point along the axis of Fig. 20 spaced at half a turn from any of the sections represented by Fig. 22 or a quarter of a turn of the worm from a section represented by Fig. 23. Fig. 25 is a section taken three-quarters of a turn of the worm from any section represented by Fig. 22, etc. Figs. 26 to 29 represent diagrammatically the positions of the worm occupied after the worm has rotated a quarter turn in the operating direction from that shown in Figs. 22 to 25, respectively.

The form of engine shown in Figs. 34 to 42 may have a constant helical pitch and worm section diameter but has an abutment wall 67 made integral with the worm 64. The abutment wall 67 is circular in form and of a diameter slightly larger than the length of the cross-sectional area of the operating space 5, its center being offset from the axis of the worm, as shown, so that it will at all times completely cover the sectional opening of the space 5. This abutment wall slides within a groove 68 formed between the adjacent ends of the portions 65 and 66 of the casing 2. Packing means 69 are used to provide a seal around this wall. A port 70 is provided in the worm 64 bridging the wall 67 so as to form a passage during certain phases of operation between the axially adjacent chambers represented diagrammatically in Fig. 36 as b' and c'.

Figure 34:
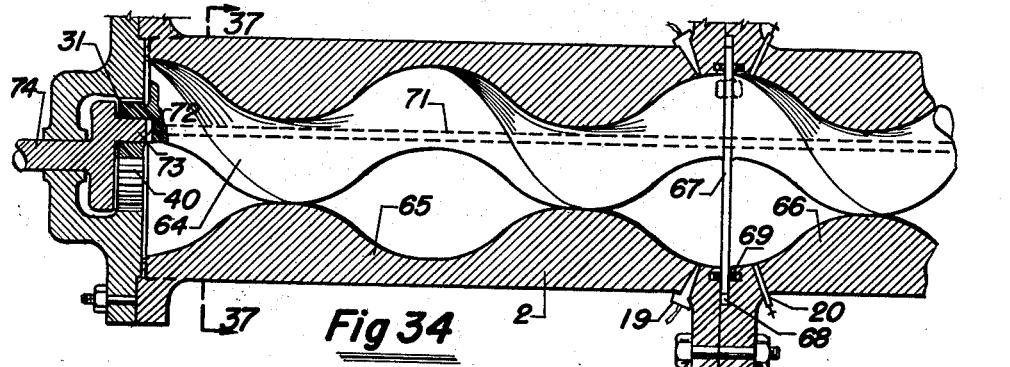
Figs. 34 to 42 show another form of engine construction in which a baffle wall is used for separating the compression and expansion chambers.
Figure 35:
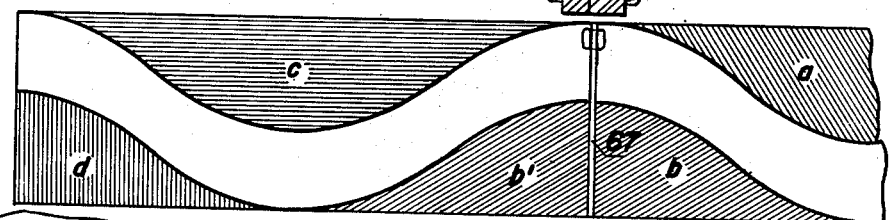
Figure 36:
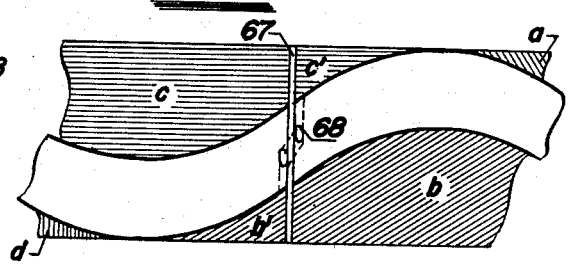
Figure 38:
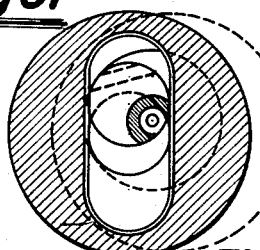
Figure 39:
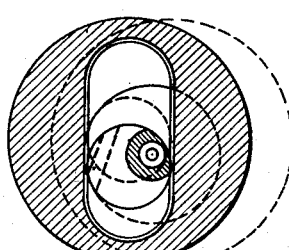
Figure 40:
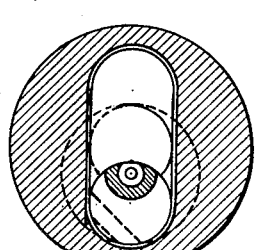
Figure 41:
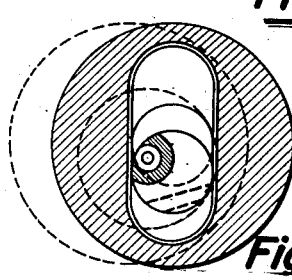
Figure 42:
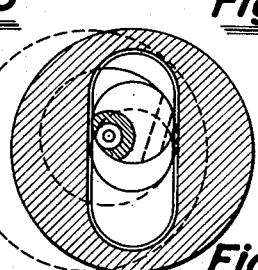

Figs. 35 and 36 are diagrams showing the relative phases and positions of the several chambers formed in the operating space of this engine. Fig. 35 corresponds to the position of the elements shown in Fig. 34, while Fig. 36 shows them advanced a quarter of a turn of the worm after the phase illustrated in Fig. 35. It will be noted that chamber b–b' is divided in two by the abutment wall 67. The portion b of this chamber has just been closed off and is under combustion and expansion while the portion b' is being compressed and is about ready to be opened by the port 68 to the newly formed portion c' of the chamber c on the right hand side of the abutment wall 67 as may be seen in Fig. 36. The portion c of the chamber space c–c' is in the meantime being compressed and will later be connected across this wall by the same port to the right end portion of the chamber space d when that chamber will have approached the position of the abutment wall 67. Injectors 19 and ignition means 20 may be provided, as shown, in the casing 2, to supply the necessary fuel and combustion at the proper time in the cycle of operation.

A simple form of transmission gearing is shown wherein the worm has the planetary gear 31 integrally formed thereon. This planetary gear meshes with the internal ring gear 40 mounted rigidly on the casing 2. The worm 64 is axially bored all the way through at 71 and the gear 31 is counterbored at 72 to provide a bearing for the crank pin 73 mounted on the crank shaft 74 from which the power may be transmitted to any driven means. The conduit formed by the bore 71 may be used for conducting cooling fluid to the hot portions of the worm or for other obvious purposes when desired.

Figure 37:
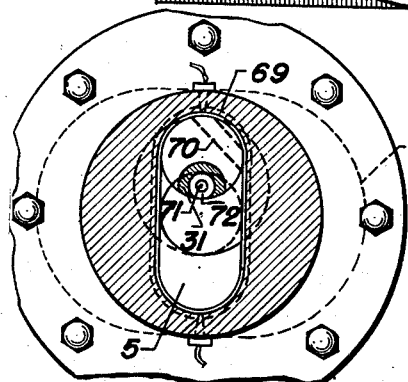

Figs. 38 to 42 are not complete sectional views, although they are all taken at the same section line 37 shown in Fig. 34. These figures are more or less diagrammatical and merely indicate the relative positions of the worm member in six different positions when taken together with Fig. 37, representing six successive stages in a complete revolution of the worm member. The worm member in this engine has a right-hand helical axis whereas the worm members in the other forms of engines shown herein have left-hand helical axes. Whether the helical axis is left-hand or right-hand is a matter of choice and design. The operation is unaffected in either case, but the direction of rotation depends on this feature. For example, looking at the engine of Fig. 34 from the left end of the figure, the direction of rotation of the worm about the axis of the operating space is clockwise, whereas in the other forms of engines described herein, where the worm has a left-hand helical axis the direction of rotation viewed from the same end is counterclockwise.

In any of the forms of engines shown, compressed air may be used for starting as indicated somewhat diagrammatically in Fig. 43; the compressed air being stored in a reservoir 75, and replenished by bleeding a part of the compressed charges during operation and conducting them to the reservoir by means of a conduit 78 having a check valve 79 therein. The engine shown in this figure is of the type illustrated sectionally in Fig. 34, having a wall 67 separating the compressing chamber on its left side from the expanding chamber on its right. The engine is started by turning on the control valve 82 and delivering the compressed air through the conduit 83 into the expanding chamber.

For the purpose of getting speed increase in the drive, the planetary gear 76 on the worm piston axis may be made with a pitch diameter smaller than the helical pitch diameter of the worm piston, and meshed with a sun gear 77 on a drive shaft 80 mounted axially of the operating space for driving a centrifuge 81 or any other high speed device.

Various other modifications in the form and details of the several devices comprising the present invention may be made without departing from the spirit and scope thereof, as defined in the appended claims.

The invention described herein may be manufactured and used by or for the Government of the United States of America for governmental purposes without the payment of any royalties thereon or therefor.

What is claimed is:

1. An internal combustion engine comprising a worm-shaped piston element of a constant helical pitch diameter and having a circular cross-section and a helical pitch which is reduced in its mid-portion, a stator element providing an axially twisted operating space therefor, having double the helical pitch in the corresponding portions and a cross-section equal in width to the diameter of said circular cross-section and having semi-circular ends with their centers spaced apart a distance equal to twice the helical pitch diameter of said piston element, whereby a true planetary relative motion between the elements is obtained during which chambers are formed and closed by continuous line contact seals at one end of said elements, moved toward the other end while being compressed as they pass through the mid portion and expanded as they pass to the other end where they are opened and discharged, fuel supply means for said chambers, ignition means in the wall of the mid portion of said operating space, compressed-air starting means connected to the expanding portion of the operating space, and means for replenishing said starting means with compressed air by bleeding a negligible portion of the compressed gases from said mid-portion of the operating space.

2. An internal combustion engine comprising a worm-shaped piston element of constant helical pitch and pitch diameter, but having a variable circular cross-section, a stator element providing an axially twisted operating space therefor, having double the helical pitch in the corresponding portions and a cross-section equal in width to the diameter of said circular cross-section and having semi-circular ends with their centers spaced apart a distance equal to twice the helical pitch diameter of said piston element, whereby a true planetary relative motion between the elements is obtained during which chambers are formed and closed by continuous line contact seals at one end of said elements, moved toward the other end while being compressed as they pass through the mid-portion, and expanded as they pass to the other end, where they are opened and discharged, fuel supply means for said chambers, ignition means in the wall of the mid-portion of said operating space, compressed-air starting means connected to the expanding portion of the operating space, and means for replenishing said starting means with compressed air by bleeding a negligible portion of the compressed air from said mid-portion of the operating space.

3. An internal combustion engine comprising a worm-shaped piston element of a constant helical pitch diameter and circular cross-section, and having a helical pitch which is reduced in its mid portion, a stator element providing an axially twisted operating space therefor, having double the helical pitch in the corresponding portions and a cross-section equal in width to the diameter of said circular cross-section and having semi-circular ends with their centers spaced apart a distance equal to twice the helical pitch diameter of said piston element, whereby a true planetary relative motion between the elements is obtained during which chambers are formed and closed by continuous line contact seals at one end of said elements, moved toward the other end while being compressed as they pass through the mid-portion, and expanded as they pass to the other end, where they are opened and discharged, fuel supply means for said chambers, ignition means in the wall of the mid-portion of said operating space, compressed-air starting means connected to the expanding portion of the operating space, and means for replenishing said starting means with compressed air by bleeding a negligible portion of the compressed air from said mid-portion of the operating space, said stator element having an axial internal ring gear formed at one end thereof, with a pitch diameter equal to twice the pitch diameter of the piston element, a planetary gear having a pitch diameter equal to that of the piston element formed on the end of said piston element and meshing with said ring gear, a drive shaft having a crank pivotally connected to said planetary gear and a spider frame connected to said end of the stator element supporting a bearing for said drive shaft.

4. An internal combustion engine, a worm-shaped piston element of constant helical pitch and pitch diameter, a stator element providing an axially twisted operating space therefor, having double the helical pitch and a cross-sectional area equal in width to the diameter of said circular cross-section and having semi-circular ends with their centers spaced apart a distance equal to twice the helical pitch diameter of said piston element, a transverse wall member formed on said piston element operating slidably in a groove formed in said stator element, a port in said piston element opening at opposite sides of said wall member and so positioned as to form a connection between a reduced chamber on one side thereof and a newly forming chamber on the other side thereof for conducting the compressed gases after suitable compression thereof, fuel injection means in the stator element for said newly forming chamber, means for igniting the combustible mixture thus formed in said newly forming chamber, and sealing means between the slidable surfaces on said wall member and the groove within which it slides.

5. An internal combustion engine as defined in claim 4 wherein the piston has at least one complete helical turn on each side of said wall member.

6. An internal combustion engine as defined in claim 4 wherein the piston member has at least one complete helical turn on each side of the wall member, compressed air starting means connected to the newly forming chamber, and means for replenishing the compressed air in said starting means by bleeding a negligible amount of the compressed air in the reduced chamber of the internal combustion engine during operation.

7. A rotary reciprocation internal combustion engine comprising two relatively rotatable elements on eccentric parallel axes, one being internal with respect to the other, the internal element comprising a helical worm of circular cross section normal to the axes of rotation, the pitch helix of said worm having a radius equal to the eccentricity of said axes, said outer element forming a cooperating helical working space of an elongated cross section normal to the axes having a width equal to the diameter of the circular worm section and semicircular ends centered at points spaced from the space axis a distance twice the eccentricity of said axes, said working space being helically formed about its own axis but having a helical pitch double that of said worm along corresponding increments of said axes, said space helix having at least one complete turn, whereby at least one closed chamber may be formed between said elements, said elements being shaped beyond said one complete turn to provide a reduction in the volume of the closed chambers as they leave said turn during rotation of said elements, air inlet means to the chambers at the beginning of said first turn, fuel supply means to said chambers, and ignition means exposed to said chambers after their volume has been suitably reduced.

8. The combination defined in claim 7, wherein said helical pitches are reduced at least within the second complete turn of said working space helix to provide said volume reduction of the closed chambers.

9. The combination defined in claim 7, wherein said elements have reduced helix pitches beyond said one complete turn for at least one additional turn of said working space to provide said volume reduction of the closed chambers, and then have increased helix pitches to expand said chambers for at least another additional turn of said working space to at least their original volumes.

10. The combination defined in claim 7, wherein said elements have a reduced worm diameter and correspondingly reduced width of the working space beyond said one complete turn for at least one additional turn of said working space to provide said volume reduction of the closed chambers, and then have increased worm diameter and correspondingly increased width of the working space cross section to expand said chambers for at least another additional turn of said working space to at least their original volumes.

11. The combination defined in claim 10, wherein the elements in addition to having reduced and then increased worm diameter and correspondingly reduced and then increased width of the working space, also further have reduced and then increased helix pitches respectively to provide increased variations in the chamber volumes within predetermined axial dimensions.

HENRY D. CANAZZI.
WALTER S. PAWL.

REFERENCES CITED

The following references are of record in the file of this patent:

UNITED STATES PATENTS

| Number | Name | Date |
|---|---|---|
| 1,892,217 | Moineau | Dec. 27, 1932 |
| 2,136,066 | Walters | Nov. 8, 1938 |
| 2,138,490 | Haller | Nov. 29, 1938 |
| 2,296,768 | Cochran | Sept. 22, 1942 |
| 2,362,550 | Hansen | Nov. 14, 1944 |

FOREIGN PATENTS

| Number | Country | Date |
|---|---|---|
| 427,475 | Great Britain | Apr. 15, 1935 |
| 436,843 | Great Britain | Oct. 18, 1935 |
| 108,420 | Australia | Sept. 14, 1939 |
| 695,539 | France | Sept. 30, 1930 |
| 150,078 | Switzerland | Dec. 16, 1931 |
| 85,331 | Sweden | Jan. 21, 1936 |
| 89,284 | Sweden | May 19, 1937 |